US 6,538,500 B2

(12) United States Patent
Hayat-Dawoodi et al.

(10) Patent No.: US 6,538,500 B2
(45) Date of Patent: Mar. 25, 2003

(54) POWER EFFICIENT LINE DRIVER WITH 4X SUPPLY VOLTAGE SWING AND ACTIVE TERMINATION

(75) Inventors: Kambiz Hayat-Dawoodi, Plano, TX (US); Anil Kumar, Bangalore (IN); Fernando D. Carvajal, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/938,776

(22) Filed: Aug. 24, 2001

(65) Prior Publication Data

US 2002/0024381 A1 Feb. 28, 2002

Related U.S. Application Data

(60) Provisional application No. 60/229,285, filed on Aug. 31, 2000.

(51) Int. Cl.$^7$ .................................................. G06G 7/12
(52) U.S. Cl. ........................................................ 327/560
(58) Field of Search ................................. 327/560, 561, 327/562, 563

(56) References Cited

U.S. PATENT DOCUMENTS

| 6,177,789 B1 | * | 1/2001 | Mohan et al. | 323/316 |
| 6,307,765 B1 | * | 10/2001 | Choi | 315/DIG. 4 |
| 6,327,309 B1 | * | 12/2001 | Dreyer et al. | 333/131 |

* cited by examiner

Primary Examiner—Jeffrey Zweizig
(74) Attorney, Agent, or Firm—Alan K. Stewart; W. James Brady, III; Frederick J. Telecky, Jr.

(57) ABSTRACT

A differential line driver with 4X supply voltage swing with a 1:1 transformer, which enhances the loop length for applications such as digital subscriber line includes: a differential circuit having first and second input nodes, first and second output nodes 52 and 54, and a supply voltage node; a transformer 22 having a first coil coupled between the first and second output nodes; and a center tap 50 of the first coil coupled to the supply voltage node. The device also acts as an active impedance termination, which eliminates the series termination resistor in conventional hybrids and thereby saving 6 dB transmit power.

16 Claims, 1 Drawing Sheet

POWER EFFICIENT LINE DRIVER WITH 4X SUPPLY VOLTAGE SWING AND ACTIVE TERMINATION

This application claims priority under 35 USC §119 (e)(1) of provisional application No. 60/229,285 filed Aug. 31, 2000.

FIELD OF THE INVENTION

This invention generally relates to electronic systems, and more particularly it relates to power efficient line drivers.

BACKGROUND OF THE INVENTION

Analog front-ends for Digital Subscriber Line (DSL) and Local Area Network (LAN) increasingly require to operate at lower supply voltages while larger output line driver voltages are required for operation on longer loops as well as enabling multilevel modulation for higher bit rate transmissions. At the lower supply voltage levels power efficiency is even more critical and hence 6 dB signal loss in terminating/matching resistors is significant. One solution to raise the output signal level would be to use a higher turn ratio transformer. The problem with this apart from the cost is that the receiver input noise specification would need to be reduced by the same ratio. Prior art References [1] B. Nauta and M. Dijkstra, "Analog Video Line Driver with Adaptive Impedance Matching" ISSCC Digest of Technical Papers, pp. 318–319, February 1998 and [2] Rajeevan Mahadevan and David Johns, "A Differential 160 MHz Self-Terminating Adaptive CMOS Line Driver" ISSCC Digest of Technical Papers, pp. 436–437, February 2000 discuss single-ended and differential methods of synthesizing the terminating impedances respectively. FIG. 1 shows the simplified prior art circuit in Reference [1]. Amplifier OP1 in conjunction with transistors M1 and M2, and resistor R2 provide an output impedance of R2/(1+N) due to the feedback. Amplifier OP3 forces input TXin and output TXout to be equal and hence sets the driver gain to one. Amplifiers OP1' and OP3', transistors M1' and M2', and resistor R2' perform the same for the negative input. This ensures that the impedance matches that of the output line. Amplifier OP2 stops DC loss in the outputs, as the output common mode is forced to the same voltage. The circuit can be used as an impedance synthesizer by disabling the loop which forces TXin=TXout. This allows gain to be achieved in the driver stage.

The major draw backs of this method is the limited output swing, the extra trimming needed for the correct synthesized impedance, and the extra low frequency tuning loop needed to avoid DC loss in the termination.

SUMMARY OF THE INVENTION

Generally, and in one form of the invention, a line driver circuit includes: a differential circuit having first and second input nodes, first and second output nodes, and a supply voltage node; a transformer having a first coil coupled between the first and second output nodes; and a center tap of the first coil coupled to the supply voltage node.

DESCRIPTION OF PREFERRED EMBODIMENTS

Figure 1:
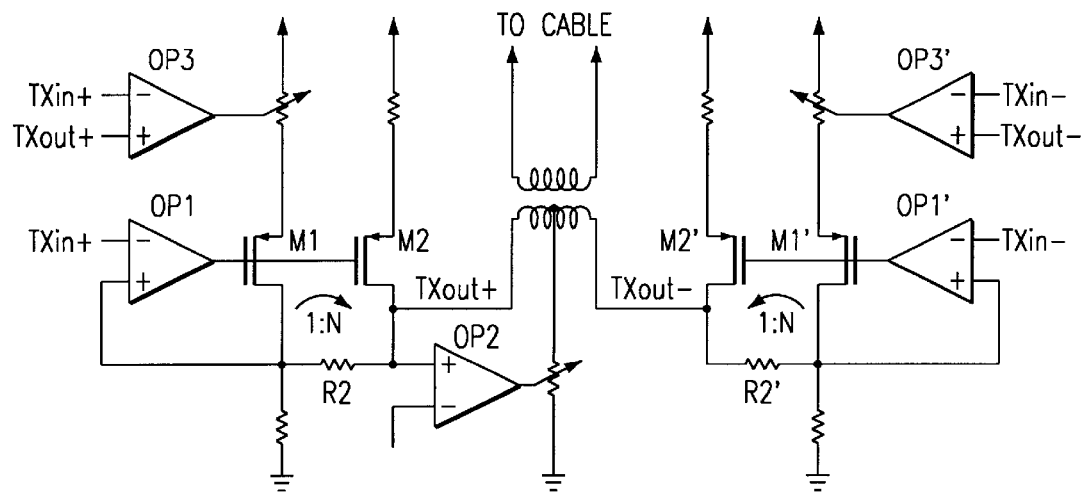
FIG. 1 is a circuit diagram of a prior art line driver.
Figure 2:
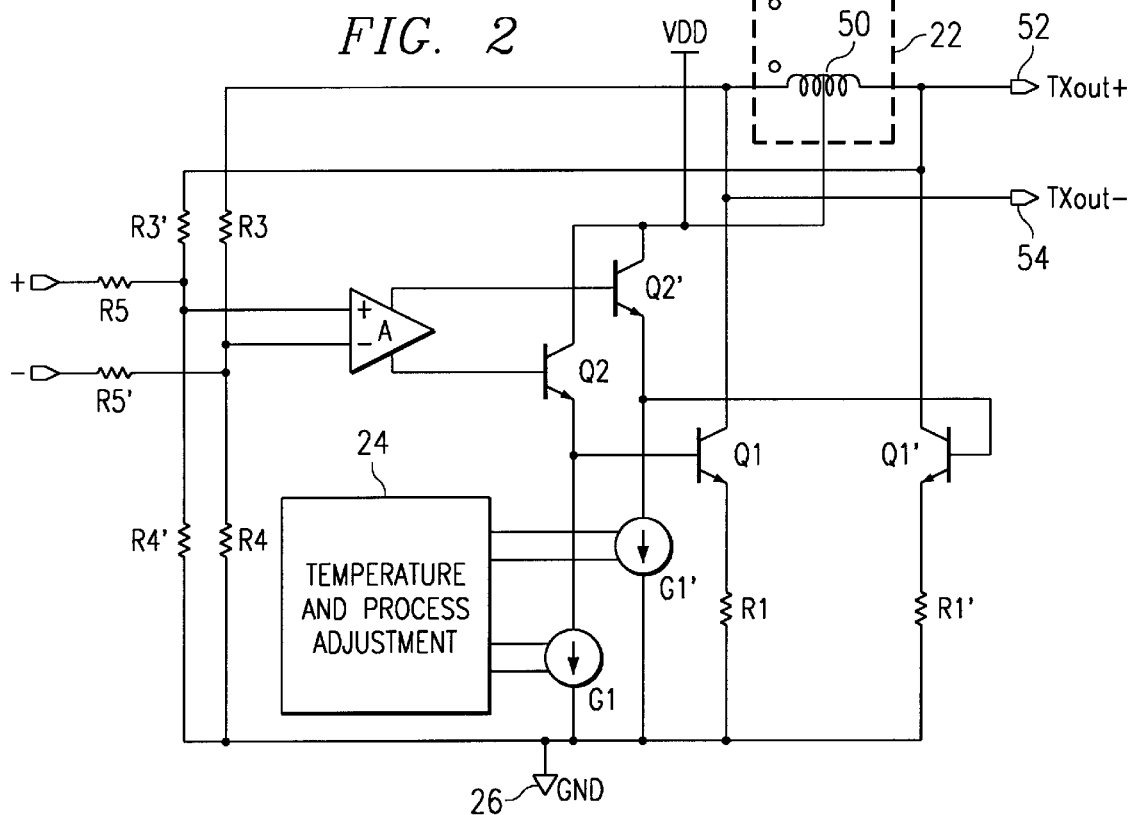
FIG. 2 is a circuit diagram of a preferred embodiment power efficient line driver with active termination synthesizer.

A preferred embodiment power efficient line driver with terminating impedance synthesis circuit is shown in FIG. 2. The device of FIG. 2 includes amplifier 20; transistors Q1, Q1', Q2, and Q2'; resistors R1, R1', R3, R3', R4, R4', R5, and R5'; current sources G1 and G1'; transformer 22; resistance RL; temperature/process adjustment device 24; supply voltage VDD; and common node 26. Transformer 22 is a 1:1 transformer. Resistance RL represents the line impedance of a transmission line such as a coaxial cable or twisted pair. The preferred embodiment line driver of FIG. 2 achieves two times the voltage swing as compared to prior art systems which use the same transformer turns ratio. With a single ended voltage supply of 5 volts, a theoretical differential peak-to-peak swing of 20 volts is possible with this circuit. This is achieved by the transformer center tap 50 biased to the supply voltage VDD which allows the driver output at nodes 52 and 54 to swing on the positive supply in effect doubling its output voltage range. As the output voltage TXOUT+ is pulled low by transistor Q1' transistor Q1 is driven in anti-phase and output voltage TXOUT− rises by the same amount due to the transformer effect.

The synthesized impedance is calculated as follows:

$$Rout = 2*(R1+Re)*(R3+(R4\|R5))/A(R4\|R5)$$

If R1 is >>Re, then the above equation simplifies to:

$$Rout = 2* R1*(R3+(R4\|R5))/A(R4\|R5)$$

Where resistor R1 is an external resistor used for accurate impedance synthesis, Re is the dynamic resistance of transistor Q1, and R1=R1', R3=R3', R4=R4', R5=R5', and G1=G1'. In low power applications where Re is not negligible the best performance is achieved by matching Re to R1.

Several advantages are provided by the preferred embodiment circuit of FIG. 2. This solution produces a peak-to-peak signal swing equal to 4 times the supply voltage which provides an excellent solution for low voltage systems. The need for series terminating resistors is eliminated with this circuit. This eliminates power dissipation across those resistors thereby increasing the efficiency of the circuit. This solution also eliminates the need for external resistors or capacitors thereby reducing the external component count.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A circuit comprising:

an amplifier coupled between first and second input nodes and first and second output nodes;

a first resistance coupled between the first input node and the first output node;

a second resistance coupled between the second input node and the second output node;

a third resistance coupled between the first output node and a common node;

a fourth resistance coupled between the second output node and the common node;

a transformer having a first coil coupled between the first and second output nodes; and a center tap of the first coil coupled to a supply voltage node.

2. The circuit of claim 1 wherein the first resistance comprises:

a first resistor coupled between the first input node and a first input node of the amplifier; and a second resistor coupled between the first input node of the amplifier and the first output node.

3. The circuit of claim 2 wherein the second resistance comprises:

a third resistor coupled between the second input node and a second input node of the amplifier; and a fourth resistor coupled between the second input node of the amplifier and the second output node.

4. The circuit of claim 3 further comprising:

a fifth resistor coupled between the first input node of the amplifier and the common node; and a sixth resistor coupled between the second input node of the amplifier and the common node.

5. The circuit of claim 1 wherein the third resistance comprises:

a first resistor coupled to the common node; and a first transistor coupled between the first resistor and the first output node.

6. The circuit of claim 5 wherein the fourth resistance comprises:

a second resistor coupled to the common node; and a second transistor coupled between the second resistor and the second output node.

7. The circuit of claim 6 further comprising:

a third transistor coupled between a control node of the first transistor and the center tap, a control node of the third transistor is coupled to a first output of the amplifier; and a fourth transistor coupled between a control node of the second transistor and the center tap, a control node of the fourth transistor is coupled to a second output of the amplifier.

8. The circuit of claim 7 further comprising:

a first current source coupled between the third transistor and the common node; and a second current source coupled between the fourth transistor and the common node.

9. The circuit of claim 1 wherein a second coil of the transformer is coupled to a transmission line.

10. A circuit comprising:

an amplifier;

a first transistor having a control node coupled to a first output node of the amplifier;

a second transistor having a control node coupled to a second output node of the amplifier;

a third transistor having a control node coupled to a first end of the first transistor;

a fourth transistor having a control node coupled to a first end of the second transistor; and a first coil of a transformer having a first end coupled to a first end of the third transistor, a second end coupled to a first end of the fourth transistor, and a center tap coupled to a first end of the first transistor and to a first end of the second transistor.

11. The circuit of claim 10 further comprising:

a first resistor coupled between a second end of the third transistor and a common node; and a second resistor coupled between a second end of the fourth transistor and the common node.

12. The circuit of claim 10 further comprising:

a first resistor coupled between a first input node of the amplifier and the first end of the first coil; and a second resistor coupled between a second input node of the amplifier and the second end of the first coil.

13. The circuit of claim 12 further comprising:

a third resistor coupled between the first input node of the amplifier and a positive input node; and a fourth resistor coupled between the second input node of the amplifier and a negative input node.

14. The circuit of claim 13 further comprising:

a fifth resistor coupled between the first input node of the amplifier and a common node; and a sixth resistor coupled between the second input node of the amplifier and a common node.

15. The circuit of claim 10 further comprising:

a first current source coupled to a second end of the first transistor; and a second current source coupled to a second end of the second transistor.

16. The circuit of claim 10 further comprising a second coil of the transformer coupled to a transmission line.

* * * * *